(12) United States Patent
Kolb et al.

(10) Patent No.: US 7,078,467 B1
(45) Date of Patent: Jul. 18, 2006

(54) SINGLE CATALYST LOW, MEDIUM AND HIGH DENSITY POLYETHYLENES

(75) Inventors: Rainer Kolb, Kingwood, TX (US); John F. Szul, Hurricane, WV (US)

(73) Assignee: Univation Technologies, LLC, Houston, TX (US)

( * ) Notice: Subject to any disclaimer, the term of this patent is extended or adjusted under 35 U.S.C. 154(b) by 0 days.

(21) Appl. No.: 11/152,719

(22) Filed: Jun. 14, 2005

(51) Int. Cl.
C08F 2/34 (2006.01)
C08F 210/02 (2006.01)

(52) U.S. Cl. .................... 526/88; 526/87; 526/160; 526/170; 526/901; 526/905

(58) Field of Classification Search ............. 526/160, 526/170, 87, 88, 901, 905
See application file for complete search history.

(56) References Cited

U.S. PATENT DOCUMENTS

| | | | |
|---|---|---|---|
| 4,704,491 A | 11/1987 | Tsutsui et al. | 585/10 |
| 4,794,096 A * | 12/1988 | Ewen | 502/117 |
| 5,084,534 A | 1/1992 | Welborn, Jr. et al. | 526/160 |
| 5,086,134 A | 2/1992 | Antberg et al. | 526/126 |
| 5,218,071 A | 6/1993 | Tsutsui et al. | 526/348 |
| 5,258,475 A | 11/1993 | Promel | 526/129 |
| 5,387,660 A | 2/1995 | Doyle et al. | 526/69 |
| 5,466,649 A | 11/1995 | Jejelowo | 502/120 |
| 6,242,545 B1 | 6/2001 | Jejelowo et al. | 526/160 |
| 6,248,845 B1 | 6/2001 | Loveday et al. | 526/113 |
| 6,936,675 B1 * | 8/2005 | Szul et al. | 526/348.2 |
| 2005/0058847 A1 | 3/2005 | Szul et al. | 428/523 |

FOREIGN PATENT DOCUMENTS

| | | |
|---|---|---|
| EP | 0 413 326 A2 | 2/1991 |
| EP | 0 443 686 A2 | 8/1991 |
| EP | 0 612 768 A1 | 8/1994 |
| EP | 0 669 346 A1 | 8/1995 |
| WO | WO 97/22635 | 6/1997 |
| WO | WO 2004/000919 | 7/2002 |

OTHER PUBLICATIONS

Kim et al, Synthesis of Tailor-Made Polyethylene through the Control of Polymerizatin Conditions Using Selectively Combined Metallocene Catalysts in a Supported System, J. of Poly. Sci.: Pt. A: Poly. Chem., vol. 37, 331-339 (1999).*
Heiland, Kirstin and Kaminsky, Walter "*Comparison of zirconocene and hafnocene catalysts for the polymerization of ethylene and l-butene*" Makromol. Chem., 193 601-610 (1992).
Metallocene-Based Polyolefins 12-14 (John Scheirs & W. Kaminsky, eds John Wiley & Sons, Ltd. 2000).
Tian, Jun and Huang, Baotong, "*Ethylene polymerization with catalyst systems based on metallocenes with varying steric hindrance and methylaluminoxane*" Macromol. Rapid Commun., 15, 923-928 (1994).
Szul, John et al., U.S. Appl. No. 10/872,847, filed Jun. 21, 2004 entitled "*Methods for Producing Polymers with Cotnrol Over Composition Distribution*".
Soares, J.B.P. and Hamielec, A.E., "*Metallocene/Aluminoxane Catalysts for Olefin Polymerization. A Review*" Polymer Reaction Engineering, 3(2), 131-200 (1995).
Hamielec, A.E. and Soares, J.B.P., "*Polymerization Reaction Engineering—Metallocene Catalysts*" Prog. Polym. Sci., vol. 21, 651-706 (1996).

* cited by examiner

*Primary Examiner*—Fred Teskin
(74) *Attorney, Agent, or Firm*—Kevin M. Faulkner; Leandro Arechecierra (57) ABSTRACT

A method of polymerizing olefins comprising combining in one embodiment ethylene and optionally one or more α-olefins with a catalyst composition in a continuous polymerization reactor at a pressure of less than 10,000 kPa; wherein the catalyst composition comprises a hafnocene; and isolating a polyethylene having a density in the range of from 0.930 to 0.975 g/cm³. Also provided is a method of transitioning a continuous polymerization reactor from production of a low density polyethylene to a medium or high density polyethylene. Also provided is a medium to high density polyethylene suitable for injection or rotomolding applications. Also provided is a single catalyst composition suitable for such needs.

5 Claims, 4 Drawing Sheets

SINGLE CATALYST LOW, MEDIUM AND HIGH DENSITY POLYETHYLENES

FIELD OF THE INVENTION

The present invention relates to single-catalyst composition production of low, medium and high density polyethylenes without the need to change the catalyst composition, and relates particularly to the production of medium and high density polyethylenes using a catalyst composition that is also capable of producing low density polyethylenes, and more particularly, to the production in a low pressure reactor of medium and high density polyethylenes at high productivities under varying conditions of comonomer and hydrogen.

BACKGROUND OF THE INVENTION

The most studied metallocenes to date are titanium and zirconium based mono- and bis-cyclopentadienyl metallocenes. These catalysts, in particular, zirconocenes, are known to produce low density polyethylenes—those having a density of about less than 0.930 g/cm$^3$—at an advantageously high activity under many types of reactor conditions. However, it is known that the most studied metallocenes to date do not produce higher density polyethylenes—those whose density is above 0.930 g/cm$^3$—at a productivity that is commercially acceptable. See, e.g., 1 METALLOCENE-BASED POLYOLEFINS 12–14 (J. Scheirs & W. Kaminsky, eds., John Wiley & Sons 2000). Furthermore, it is known that hydrogen reduces the productivity of most metallocenes. See, e.g., J. B. P. Soares and A. E. Hamielec in 3(2) POLYMER REACTION ENGINEERING 131–200 (1995). This is a disadvantage in that hydrogen is useful (and most often necessary) for increasing the melt index ($I_2$) of the polyethylene being produced, higher $I_2$ (e.g., 5–50 dg/min) resins being desirable for such applications as rotomolding and injection molding products. It is also a disadvantage in that it would be desirable to use the same catalyst composition when transitioning between high, medium and low density polyethylene products in a single or multiple reactor(s), and avoiding the current need of having to change catalyst composition in order to achieve different resin products.

Metallocene derived resins have many advantageous properties that provide commercially attractive products. What would be desirable is a metallocene catalyst composition that is capable of producing medium and high density polyethylenes at commercially attractive productivities, especially polyethylenes useful in rotomolding and injection molding applications. Further, it would be useful to provide a metallocene that is capable of being used to produce a wide melt index and wide density range of polyethylene resins at commercially attractive productivities. The inventors here have discovered such a catalyst composition and process for producing these resins.

SUMMARY OF THE INVENTION

One aspect of the invention is to a method of polymerizing olefins comprising combining ethylene, at a partial pressure of at least 1300 kPa in one embodiment, and optionally one or more α-olefins with a catalyst composition in a polymerization reactor, preferably a continuous polymerization reactor, at a pressure of less than 10,000 kPa; wherein the catalyst composition comprises a hafnocene; and isolating a polyethylene having a density in the range of from 0.930 to 0.975 g/cm$^3$.

Another aspect of the invention is to a method of polymerizing olefins comprising combining ethylene and optionally one or more α-olefins with a catalyst composition in a polymerization reactor comprising polymer particles at a pressure of less than 10,000 kPa; and isolating a polyethylene having a density in the range of from 0.910 to 0.975 g/cm$^3$; wherein the bulk density of the polymer particles is greater than 0.40 g/cm$^3$ at a molar ratio of comonomer to ethylene that ranges from 0 to 0.10; and wherein the catalyst composition is not altered when producing resins within the density range.

Yet another aspect of the invention is to a method for transitioning within a single reactor from a first polyethylene product to a second polyethylene product, comprising:

(a) operating the reactor at a pressure of less than 10,000 kPa with a first molar ratio of hydrogen to ethylene and a first molar ratio of comonomer to ethylene;

(b) withdrawing a first polyethylene product;

(c) altering one or both of the molar ratio of hydrogen to ethylene and the molar ratio of comonomer to ethylene to achieve a second molar ratio of hydrogen to ethylene and a second molar ratio of comonomer to ethylene; and (d) withdrawing a second polyethylene product;

wherein the transition takes place using the same catalyst composition and wherein the density of the first polyethylene product is less than or equal to 0.920 g/cm$^3$, and the density of the second polyethylene product is greater than or equal to 0.935 g/cm$^3$.

And yet another aspect of the invention is to a polyethylene particles having an average particle size ranging from 0.4 to 0.8 mm, wherein at least 80% of the particles are from 35 to 60 mesh in size, the particles having a bulk density of greater than 0.40 g/cm$^3$ and a gradient density of from 0.930 to 0.975 g/cm$^3$, and possessing from 0.001 to 4 ppm of hafnium metal.

And yet another aspect of the invention is to a catalyst composition and use of a catalyst system comprising a catalyst component that is capable of making a polyethylene having a molecular weight distribution of from 2 to 15 in a single reactor and having a hexane extractables value of less than 2%, and further, the catalyst component capable of making polyethylenes at a density range of from 0.91 to 0.975 g/cm$^3$.

These aspects may be combined with various embodiments disclosed herein to describe the invention(s).

DETAILED DESCRIPTION OF THE INVENTION

Aspects of the present invention are directed to methods of producing medium density (0.930 to 0.940 g/cm³) to high density (>0.940 g/cm³) polyethylenes in a polymerization reactor using a catalyst composition that possesses a commercially acceptable productivity when producing low density (0.910 to less than 0.930 g/cm³) polyethylenes. Another aspect of the invention is a method of transitioning from the production of a low density polyethylene to a medium and/or high density polyethylene. This transition can take place without stopping the polymerization process, and/or without changing the polymer particle bed inside the polymerization reactor. A "catalyst component" in one embodiment is any chemical species known in the art capable of catalyzing the polymerization of ethylene monomers (and optionally comonomers) to produce polyethylene. In a preferred embodiment, the catalyst composition comprises a hafnocene; in a most preferred embodiment, the catalyst composition comprises a catalyst component consisting of a hafnocene. The various aspect of the invention can thus be described by combinations of the embodiments herein.

One aspect of the present invention is a method of polymerizing olefins comprising combining ethylene and optionally one or more α-olefins with a catalyst composition in a polymerization reactor at a pressure of less than 10,000 kPa in order to produce a polyethylene having a density in the range of from 0.930 or 0.935 to 0.965 or 0.970 or 0.975 g/cm³ while maintaining the catalyst productivity. The desired density range may comprise any combination of any lower limit with any upper limit as described herein. Preferably, the catalyst composition comprises a hafnocene. Unless otherwise indicated, the "density" referred to throughout is the so-called "gradient" density (Sample preparation method ASTM D4703-03; density test method, gradient column per ASTM D1505-03).

The "hafnocene" is a catalyst component comprising mono-, bis- or tris-cyclopentadienyl-type complexes of hafnium. In one embodiment, the cyclopentadienyl-type ligand comprises cyclopentadienyl or ligands isolobal to cyclopentadienyl and substituted versions thereof. Representative examples of ligands isolobal to cyclopentadienyl include cyclopentaphenanthreneyl, indenyl, benzindenyl, fluorenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7H-dibenzofluorenyl, indeno[1,2-9]anthrene, thiophenoindenyl, thiophenofluorenyl, hydrogenated versions thereof (e.g., 4,5,6,7-tetrahydroindenyl, or "H₄Ind") and substituted versions thereof. In one embodiment, the hafnocene is an unbridged bis-cyclopentadienyl hafnocene and substituted versions thereof. In another embodiment, the hafnocene excludes unsubstituted bridged and unbridged bis-cyclopentadienyl hafnocenes, and unsubstituted bridged and unbridged bis-indenyl hafnocenes, "unsubstituted" meaning that there are only hydride groups bound to the rings and no other group.

Preferably, the hafnocene useful in the present invention can be represented by the formula (where "Hf" is hafnium):

$$Cp_nHfX_p \qquad (1)$$

wherein n is 1 or 2, p is 1, 2 or 3, each Cp is independently a cyclopentadienyl ligand or a ligand isolobal to cyclopentadienyl or a substituted version thereof bound to the hafnium; and X is selected from the group consisting of hydride, halides, $C_1$ to $C_{10}$ alkyls and $C_2$ to $C_{12}$ alkenyls; and wherein when n is 2, each Cp may be bound to one another through a bridging group A selected from the group consisting of $C_1$ to $C_5$ alkylenes, oxygen, alkylamine, silylhydrocarbons, and siloxyl-hydrocarbons. An example of $C_1$ to $C_5$ alkylenes include ethylene (—$CH_2CH_2$—) bridge groups; an example of an alkylamine bridging group includes methylamide (—($CH_3$)N—); an example of a silylhydrocarbon bridging group includes dimethylsilyl (—($CH_3$)$_2$Si—); and an example of a siloxyl-hydrocarbon bridging group includes (—O—($CH_3$)$_2$Si—O—). In a particular embodiment of the hafnocene represented in formula (1), wherein n is 2 and p is 1 or 2.

As used herein, the term "substituted" means that the referenced group possesses at least one moiety in place of one or more hydrogens in any position, the moieties selected from such groups as halogen radicals (esp., F, Cl, Br), hydroxyl groups, carbonyl groups, carboxyl groups, amine groups, phosphine groups, alkoxy groups, phenyl groups, naphthyl groups, $C_1$ to $C_{10}$ alkyl groups, $C_2$ to $C_{10}$ alkenyl groups, and combinations thereof. Examples of substituted alkyls and aryls includes, but are not limited to, acyl radicals, alkylamino radicals, alkoxy radicals, aryloxy radicals, alkylthio radicals, dialkylamino radicals, alkoxycarbonyl radicals, aryloxycarbonyl radicals, carbamoyl radicals, alkyl- and dialkyl-carbamoyl radicals, acyloxy radicals, acylamino radicals, arylamino radicals, and combinations thereof.

More preferably, the hafnocene useful in the present invention can be represented by the formula:

$$(CpR_5)_2HfX_2 \qquad (2)$$

wherein each Cp is a cyclopentadienyl ligand and each is bound to the hafnium; each R is independently selected from hydrides and $C_1$ to $C_{10}$ alkyls, most preferably hydrides and $C_1$ to $C_5$ alkyls; and X is selected from the group consisting of hydride, halide, $C_1$ to $C_{10}$ alkyls and $C_2$ to $C_{12}$ alkenyls, and more preferably X is selected from the group consisting of halides, $C_2$ to $C_6$ alkylenes and $C_1$ to $C_6$ alkyls, and most preferably X is selected from the group consisting of chloride, fluoride, $C_1$ to $C_5$ alkyls and $C_2$ to $C_6$ alkylenes. In a most preferred embodiment, the hafnocene is represented by formula (2) above, wherein at least one R group is an alkyl as defined above, preferably a $C_1$ to $C_5$ alkyl, and the others are hydrides. In a most preferred embodiment, each Cp is independently substituted with from one two three groups selected from the group consisting of methyl, ethyl, propyl, butyl, and isomers thereof.

The polymerization process is carried out in one embodiment such that the catalyst composition is heterogeneous. Thus, the catalyst composition comprises a support material in one embodiment. The support material can be any material known in the art for supporting catalyst compositions, most preferably an inorganic oxide, most preferably silica, alumina, silica-alumina, magnesium chloride, graphite, magnesia, titania, zirconia, and montmorillonite, any of which can be chemically/physically modified such as by fluoriding processes, calcining or other processes known in the art. In a most preferred embodiment the support material is a silica material having an average particle size as determined by Malvern analysis of from 1 to 60 μm, most preferably 10 to 40 μm.

The catalyst composition comprises an activator. Any suitable activator known to activate catalyst components towards olefin polymerization may be suitable. In a preferred embodiment, the activator is an alumoxane, and most preferably methalumoxane such as described by J. B. P. Soares and A. E. Hamielec in 3(2) POLYMER REACTION ENGINEERING 131–200 (1995). The alumoxane is preferably co-supported on the support material in a molar ratio of aluminum to hafnium (Al:Hf) ranging from 80:1 to 200:1, most preferably 90:1 to 140:1.

The "polymerization reactor" can be any type of reactor known in the art that is useful in producing polyolefins and capable of being operated at an overall pressure of less than 10,000 kPa, more preferably less than 8,000 kPa, and even more preferably less than 6,000 kPa, and even more preferably less than 4,000 kPa, and most preferably less than 3,000 kPa. In one embodiment, the reactor is a "continuous" reactor, meaning that monomers and catalyst composition are continually or regularly fed to the reactor while polyethylene is continually or regularly extracted from the reactor. Such polymerization reactors include so called "slurry" reactors, "solution" reactors and "fluidized bed gas phase" reactors. Such reactors are outlined by A. E. Hamielec and J. B. P. Soares in *Polymerization Reaction Engineering—Metallocene Catalysts,* 21 PROG. POLYM. SCI. 651–706 (1996). Most preferably, the polymerization reactor useful in the invention is a continuous fluidized bed gas phase reactor. Such reactors are well known in the art and described in more detail in U.S. Pat. Nos. 5,352,749, 5,462,999 and WO 03/044061.

In one embodiment, the "polymerization reactor" comprises two or more reactors in series, those reactors being any combination of reactors; preferably the polymerization reactor is one reactor. In another embodiment, the polymerization reactor is a continuous polymerization reactor comprising a feed stream or "cycle gas" comprising the ethylene and, if present, a comonomer, both of which are flowed continuously through the polymerization reactor by any suitable means. The amount of comonomer, if present in the reactor, can be expressed as a molar ratio relative to the amount of ethylene in the reactor. Preferably, the feed stream or "cycle gas" is provided to the reactor to maintain a continuous flow of monomer and optionally comonomer, the ratio stated being a desired steady state level to produce a given type of polyethylene.

In an embodiment of a fluidized bed reactor, a monomer stream is passed to a polymerization section. As an illustration of the polymerization section, there can be included a reactor in fluid communication with one or more discharge tanks, surge tanks, purge tanks, and recycle compressors. In one or more embodiments, the reactor includes a reaction zone in fluid communication with a velocity reduction zone. The reaction zone includes a bed of growing polymer particles, formed polymer particles and catalyst composition particles fluidized by the continuous flow of polymerizable and modifying gaseous components in the form of make-up feed and recycle fluid through the reaction zone. Preferably, the make-up feed includes polymerizable monomer, most preferably ethylene and at least one other α-olefin, and may also include "condensing agents" as is known in the art and disclosed in, for example, U.S. Pat. No. 4,543,399, U.S. Pat. No. 5,405,922, and U.S. Pat. No. 5,462,999.

The fluidized bed has the general appearance of a dense mass of individually moving particles, preferably polyethylene particles, as created by the percolation of gas through the bed. The pressure drop through the bed is equal to or slightly greater than the weight of the bed divided by the cross-sectional area. It is thus dependent on the geometry of the reactor. To maintain a viable fluidized bed in the reaction zone, the superficial gas velocity through the bed must exceed the minimum flow required for fluidization. Preferably, the superficial gas velocity is at least two times the minimum flow velocity. Ordinarily, the superficial gas velocity does not exceed 1.5 m/sec and usually no more than 0.76 ft/sec is sufficient.

In general, the height to diameter ratio of the reaction zone can vary in the range of about 2:1 to about 5:1. The range, of course, can vary to larger or smaller ratios and depends upon the desired production capacity. The cross-sectional area of the velocity reduction zone is typically within the range of about 2 to about 3 multiplied by the cross-sectional area of the reaction zone.

The velocity reduction zone has a larger inner diameter than the reaction zone, and can be conically tapered in shape. As the name suggests, the velocity reduction zone slows the velocity of the gas due to the increased cross sectional area. This reduction in gas velocity drops the entrained particles into the bed, reducing the quantity of entrained particles that flow from the reactor. That gas exiting the overhead of the reactor is the recycle gas stream.

The recycle stream is compressed in a compressor and then passed through a heat exchange zone where heat is removed before it is returned to the bed. The heat exchange zone is typically a heat exchanger which can be of the horizontal or vertical type. If desired, several heat exchangers can be employed to lower the temperature of the cycle gas stream in stages. It is also possible to locate the compressor downstream from the heat exchanger or at an intermediate point between several heat exchangers. After cooling, the recycle stream is returned to the reactor through a recycle inlet line. The cooled recycle stream absorbs the heat of reaction generated by the polymerization reaction.

Preferably, the recycle stream is returned to the reactor and to the fluidized bed through a gas distributor plate. A gas deflector is preferably installed at the inlet to the reactor to prevent contained polymer particles from settling out and agglomerating into a solid mass and to prevent liquid accumulation at the bottom of the reactor as well to facilitate easy transitions between processes which contain liquid in the cycle gas stream and those which do not and vice versa. An illustrative deflector suitable for this purpose is described in U.S. Pat. No. 4,933,149 and U.S. Pat. No. 6,627,713.

The catalyst composition used in the fluidized bed is preferably stored for service in a reservoir under a blanket of a gas which is inert to the stored material, such as nitrogen or argon. The catalyst composition may be added to the reaction system, or reactor, at any point and by any suitable means, and is preferably added to the reaction system either directly into the fluidized bed or downstream of the last heat exchanger (the exchanger farthest downstream relative to the flow) in the recycle line, in which case the activator is fed into the bed or recycle line from a dispenser. The catalyst composition is injected into the bed at a point above distributor plate. Preferably, the catalyst composition is injected at a point in the bed where good mixing with polymer particles occurs. Injecting the catalyst composition at a point above the distribution plate provides satisfactory operation of a fluidized bed polymerization reactor.

The monomers can be introduced into the polymerization zone in various ways including direct injection through a nozzle into the bed or cycle gas line. The monomers can also be sprayed onto the top of the bed through a nozzle positioned above the bed, which may aid in eliminating some carryover of fines by the cycle gas stream.

Make-up fluid may be fed to the bed through a separate line to the reactor. The composition of the make-up stream is determined by a gas analyzer. The gas analyzer determines the composition of the recycle stream and the composition of the make-up stream is adjusted accordingly to maintain an essentially steady state gaseous composition within the reaction zone. The gas analyzer can be a conventional gas analyzer that determines the recycle stream composition to maintain the ratios of feed stream components. Such equipment is commercially available from a wide variety of sources. The gas analyzer is typically positioned to receive gas from a sampling point located between the velocity reduction zone and heat exchanger.

The production rate of polyolefin may be conveniently controlled by adjusting the rate of catalyst composition injection, activator injection, or both. Since any change in the rate of catalyst composition injection will change the reaction rate and thus the rate at which heat is generated in the bed, the temperature of the recycle stream entering the reactor is adjusted to accommodate any change in the rate of heat generation. This ensures the maintenance of an essentially constant temperature in the bed. Complete instrumentation of both the fluidized bed and the recycle stream cooling system is, of course, useful to detect any temperature change in the bed so as to enable either the operator or a conventional automatic control system to make a suitable adjustment in the temperature of the recycle stream.

Under a given set of operating conditions, the fluidized bed is maintained at essentially a constant height by withdrawing a portion of the bed as product at the rate of formation of the particulate polymer product. Since the rate of heat generation is directly related to the rate of product formation, a measurement of the temperature rise of the fluid across the reactor (the difference between inlet fluid temperature and exit fluid temperature) is indicative of the rate of particular polymer formation at a constant fluid velocity if no or negligible vaporizable liquid is present in the inlet fluid.

On discharge of particulate polymer product from reactor, it is desirable and preferable to separate fluid from the product and to return the fluid to the recycle line. There are numerous ways known to the art to accomplish this separation. Product discharge systems which may be alternatively employed are disclosed and claimed in U.S. Pat. No. 4,621,952. Such a system typically employs at least one (parallel) pair of tanks comprising a settling tank and a transfer tank arranged in series and having the separated gas phase returned from the top of the settling tank to a point in the reactor near the top of the fluidized bed.

In the fluidized bed gas-phase reactor embodiment, the reactor temperature of the fluidized bed process herein ranges from 70° C. or 75° C. or 80° C. to 90° C. or 95° C. or 100° C. or 110° C., wherein a desirable temperature range comprises any upper temperature limit combined with any lower temperature limit described herein. In general, the reactor temperature is operated at the highest temperature that is feasible, taking into account the sintering temperature of the polyolefin product within the reactor and fouling that may occur in the reactor or recycle line(s).

The process of the present invention is suitable for the production of homopolymers comprising ethylene derived units, or copolymers comprising ethylene derived units and at least one or more other olefin(s) derived units. The final polyethylene product may comprise from 0 to 15 or 20 wt % comonomer derived units. Preferably, ethylene is homopolymerized or copolymerized with α-olefins containing from 3 to 12 carbon atoms in one embodiment, and from 4 to 10 carbon atoms in yet another embodiment, and from 4 to 8 carbon atoms in a preferable embodiment. Even more preferably, ethylene is copolymerized with 1-butene or 1-hexene, to form the polyethylene of the invention.

In order to maintain an adequate catalyst productivity in the present invention, it is preferable that the ethylene is present in the reactor at a partial pressure at or greater than 190 psia (1300 kPa), or 200 psia (1380 kPa), or 210 psia (1450 kPa), or 220 psia (1515 kPa); and less than 10,000 kPa in a preferred embodiment.

The comonomer, if present in the polymerization reactor, is present at any level that will achieve the desired weight percent incorporation of the comonomer into the finished polyethylene. This is expressed as a mole ratio of comonomer to ethylene as described herein, which is the ratio of the gas concentration of comonomer moles in the cycle gas to the gas concentration of ethylene moles in the cycle gas. In one embodiment of polyethylene production, the comonomer is present with ethylene in the cycle gas in a mole ratio range of from 0 or 0.0001 (comonomer:ethylene) to 0.20 or 0.10, and from 0.001 to 0.080 in another embodiment, and from 0.001 to 0.050 in yet another embodiment, and from 0.002 to 0.030 in yet another embodiment, wherein a desirable range may comprise any combination of any upper limit with any lower limit as described herein. The process of the invention may be particularly characterized in that when the molar ratio of α-olefin to ethylene present in the reactor ranges from, or is changed within, the ranges indicated above, the catalyst productivity does not vary by more than 30% or 20% or 10%.

Hydrogen gas may also be added to the polymerization reactor(s) to control the final properties (e.g., $I_{21}$ and/or $I_2$, bulk density) of the polyethylene composition. In one embodiment, the ratio of hydrogen to total ethylene monomer (ppm $H_2$: mol % $C_2$) in the circulating gas stream is in a range of from 0 to 60:1 in one embodiment, and from 0.10:1 (0.10) to 50:1 (50) in another embodiment, and from 0.12 to 40 in yet another embodiment, and from 0.15 to 35 in yet another embodiment, wherein a desirable range may comprise any combination of any upper mole ratio limit with any lower mole ratio limit described herein. The process of the invention may also be particularly characterized in that when the molar ratio of hydrogen to ethylene present in the reactor ranges, or is changed within, the ranges indicated above, the catalyst productivity does not vary by more than 30% or 20% or 10%.

By "productivity", what is meant is the number of grams of polyethylene produced relative to the number of grams of catalyst composition used, unless otherwise indicated. The catalyst composition productivity can be calculated any number of ways as is known in the art such as by the rate at which catalyst is used ("mass balance"), or by looking at the production rate calculated by the heat balance divided by the catalyst feed rate calculated from the feeder information (esp., rpm's, fill efficiency, number of holes in the disk, volume of each hole, catalyst bulk density) ("heat balance"), or by the amount of residual Hf or Al, preferably Hf, in the resin composition. This later method is preferred, but it is not a limiting factor in the invention as long as the productivity is determined in a consistent manner throughout the polymerization process under varying amounts of hydrogen, comonomer, temperature, etc. The amount of residual metal in the catalyst can be determined by any means known in the art. One method is by using the technique of x-ray fluorescence analysis of Hf or Al residue: The hafnium and aluminum residues remaining in the polymer from the catalyst are measured by x-ray fluorescence (XRF), which was calibrated to reference standards. The polymer resin granules were compression molded at elevated temperature into plaques having a thickness of about ⅜ of an inch for the x-ray measurement in a preferred method. At very low concentrations of metal, such as below 0.1 ppm, ICP-AES would be a suitable method to determine metal residues present in the polyethylene.

The present invention is thus particularly useful for transitioning in the same reactor from one product (e.g., low density, low $I_2$) to another product (e.g., high density, high $I_2$), without the need to change catalysts compositions. Thus, an exemplary aspect of the invention is a method of polymerizing olefins comprising combining ethylene and optionally one or more α-olefins with a catalyst composition in the polymerization reactor; wherein the catalyst composition comprises a hafnocene, and wherein (a) when the molar ratio of α-olefin to ethylene present in the reactor ranges from 0 to 0.010, the catalyst composition productivity does not vary by more than 30% or 20% or 10%; and (b) when the molar ratio of the α-olefin to ethylene present in the reactor ranges from 0.010 to 0.10 the catalyst composition productivity does not vary by more than 30% or 20% or 10% relative to the productivity in step (a), wherein steps (a) and (b) may take place in any order.

In another aspect, the invention provides a method for transitioning within a single reactor from a first polyethylene product to a second polyethylene product, comprising:

(a) operating the at a pressure of less than 3,000 or 4,000 or 6,000 or 8,000 or 10,000 kPa with a first molar ratio of hydrogen to ethylene and a first molar ratio of comonomer to ethylene;

(b) withdrawing a first polyethylene product;

(c) altering one or both of the molar ratio of hydrogen to ethylene and the molar ratio of comonomer to ethylene to achieve a second molar ratio of hydrogen to ethylene and a second molar ratio of comonomer to ethylene; and (d) withdrawing a second polyethylene product;

wherein the transition takes place using the same catalyst composition and wherein the density of the first polyethylene product is less than or equal to 0.920 or 0.918 or 0.916 or 0.912 g/cm³, and the density of the second polyethylene product is greater than or equal to 0.935 or 0.937 or 0.940 g/cm³. The molar ratios of hydrogen to ethylene and comonomer to ethylene are as stated herein. This process can be carried out equally in reverse as well. Preferably, the catalyst composition is any desirable catalyst composition known in the art useful in polymerizing olefins such as, but not limited to, those that comprise a catalyst component selected from vanadium based catalysts, titanium based Ziegler-Natta catalysts (which may include a magnesium component), Group 4 metallocenes, chromium and chromium oxide based catalyst compositions, and Group 3–10 coordination-type catalysts systems (e.g., bidentate or tridentate amine/imine coordination complexes with iron, palladium, nickel or zirconium). Most preferably, the catalyst composition comprises a catalyst component consisting of a hafnocene.

In yet another aspect, the invention provides a method for transitioning within a single reactor from a first polyethylene product to a second polyethylene product, comprising:

(a) operating the at a pressure of less than 3,000 or 4,000 or 6,000 or 8,000 or 10,000 kPa with a first molar ratio of hydrogen to ethylene and a first molar ratio of comonomer to ethylene;

(b) withdrawing a first polyethylene product;

(c) altering one or both of the molar ratio of hydrogen to ethylene and the molar ratio of comonomer to ethylene to achieve a second molar ratio of hydrogen to ethylene and a second molar ratio of comonomer to ethylene; and (d) withdrawing a second polyethylene product;

wherein the transition takes place using the same catalyst composition and wherein the $I_2$ of the first polyethylene product is less than or equal to 12 or 10 or 8, and the $I_2$ of the second polyethylene product is greater than or equal to 12 or 14 or 16 ($I_2$ as measured by ASTM-D-1238-E 190° C./2.16 kg; $I_{21}$ as measured by ASTM-D-1238-F, 190° C./21.6 kg).

Preferably, the bulk density of the polymer in the reactor is at least 0.400 g/cm³ when producing any polyethylene having a gradient density of from 0.910 or 0.930 to 0.975 g/cm³, and having a comonomer:ethylene ratio at any level as indicated herein. Bulk Density (BD) was measured by pouring the polymer product via a ⅞ inch diameter funnel into a fixed volume cylinder of 400 cm³. The bulk density was measured as the weight of resin divided by 400 cm³ to give a value in g/cm³.

Thus, another aspect of the invention is to a method of polymerizing olefins comprising combining ethylene and optionally one or more α-olefins with a catalyst composition in a polymerization reactor comprising polymer particles at a pressure of less than 10,000 kPa; and isolating a polyethylene having a density in the range of from 0.910 or 0.912 or 0.915 to 0.965 or 0.970 or 0.975 g/cm³; wherein the bulk density of the polymer particles is greater than 0.40 or 0.41 g/cm³ at a molar ratio of comonomer to ethylene that ranges from 0 to 0.20; and wherein the identity of the catalyst composition is not altered when producing resins within the density range. By the phrase "the catalyst composition is not altered when producing resins within the density range", what is meant is that the polymerization reactor operator may choose to first combine the olefins and a catalyst composition under such conditions of hydrogen and comonomer concentrations that a low density polyethylene (e.g., 0.915 g/cm³) or medium density polyethylene (e.g., 0.935 g/cm³) is formed, then while injecting into the reactor the same catalyst composition, the reactor conditions alone are changed such that a high density polyethylene (e.g., 0.945 g/cm³) is formed, all at an advantageously high catalyst composition productivity. By "catalyst composition" in this aspect of the invention, what is meant is any catalyst composition known to be useful in producing polyethylenes; preferably a Group 4 metallocene, and most preferably the catalyst composition comprises a hafnocene. This process of course can be carried out in the reverse also. What is useful is that throughout this transition of resin products, the bulk density stays advantageously high as well as the catalyst composition productivity.

Depending upon the desired resin product, the present invention is suitable for forming a broad range of polyethylene homopolymers and copolymers. Preferably, the polyethylene produced from the process of the invention has a melt index ($I_2$ as measured by ASTM-D-1238-E 190° C./2.16 kg) of from 0.01 to 200 dg/min, and from 0.01 to 50 dg/min in another embodiment, and from 0.1 to 50 dg/min in yet another embodiment, wherein a desirable range may comprise any combination of any upper limit with any lower limit described herein. Further, the polyethylene may have an $I_{21}/I_2$ ($I_{21}$ as measured by ASTM-D-1238-F, 190° C./21.6 kg) value of from 10 to 100 in one embodiment, and from 10 to 50 in yet another embodiment, and from 12 to 30 in yet another embodiment, wherein a desirable range may comprise any combination of any upper limit with any lower limit described herein.

The polyethylene preferably has a molecular weight distribution of from 2 to 15 in one embodiment, and from 2 to 10 in another embodiment, and from 2.5 to 8 in yet another embodiment, and from 2.5 to 5 in yet another embodiment, wherein a desirable range may comprise any combination of any upper limit with any lower limit described herein. The polyethylenes have a hexane extractables value (as measured by 21 CFR 177.1520(d)(3)(i)) of from less than 2% in one embodiment, and less than 1% in another embodiment.

As stated throughout this specification, the density of the polyethylenes described herein can range from those characterized as low density, medium density, and high density, preferably ranging from 0.910 or 0.912 or 0.915 to 0.965 or 0.970 or 0.975 g/cm$^3$ density, and various ranges therebetween.

The inventive process is further characterized by the advantageous property that the polyethylene particles produced therefrom possess a narrow particle size distribution. In a preferred embodiment, from 80% or 90% or 95% of the particles are between 35 and 60 mesh in size. The polyethylene preferably has an average particle size of from 0.1 to 1.0 mm, more preferably in the range of from 0.4 to 0.8 mm, and most preferably in the range of from 0.45 to 0.76 mm. The resin average particle size was measured, for example, by placing nominally 100 grams of resin on the top screen of a standard sieve screen stack in a Ro-Tap™ shaker consisting of the screens 10, 18, 35, 60, 120, 200 mesh and the pan, wherewith the resin fines were defined as that combined which collects on the 200 mesh screen and the pan.

In one embodiment, the polyethylene preferably has substantially no chromium, zirconium or titanium content, that is, no or only what would be considered by those skilled in the art, trace amounts of these metals are present, such as, for example, less than 0.001 ppm. Preferably, the polyethylene comprises from 0.001 to 4 ppm of hafnium, and more preferably between 0.001 and 3 ppm of hafnium, this determined by XRF or ICP-AES as described herein.

The polyethylenes produced by the methods described herein have unique properties that can be described by any number and combination of embodiments. In one embodiment, Polyethylene particles possess an average particle size ranging from 0.4 to 0.8 mm, wherein at least 80% of the particles are from 35 to 60 mesh in size, the particles having a bulk density of greater than 0.40 g/cm$^3$ and a gradient density of from 0.930 to 0.975 g/cm$^3$, and possessing from 0.001 to 4 ppm of hafnium atoms.

Yet another aspect of the invention is to the use of a catalyst composition comprising a catalyst component capable of making such a polyethylene, in a continuous gas phase reactor operating at less than 10,000 kPa pressure in one embodiment, having a molecular weight distribution of from 2 to 15 in a single reactor and having a hexane extractables value of less than 2%, and further, the catalyst component capable of making polyethylenes at a density range of from 0.91 to 0.975 g/cm$^3$. In one embodiment, the catalyst component is a hafnocene, such as described herein.

The polyethylene can be formed into any useful article of manufacture by any suitable means. The polyethylenes of the invention are particularly well suited for being formed into an article by a rotomolding or injection molding process. Such processes are well known in the art. Typical rotomolded articles include large containers for conveying liquids, drums, agricultural tanks, and large parts such as canoes or large playground toys. Typical injection molded articles include, housewares, thin wall containers, and lids for containers.

Thus, the compositions and processes of the present invention can be described alternately by any of the embodiments disclosed herein, or a combination of any of the embodiments described herein. Embodiments of the invention, while not meant to be limiting by, may be better understood by reference to the following examples.

EXAMPLES

Catalyst Component Preparation

The hafnocene can be prepared by techniques known in the art. For example, HfCl$_4$ (1.00 equiv.) can be added to ether at −30° C. to −50° C. and stirred to give a white suspension. The suspension can then be recooled to −30° C. to −50° C. and then lithium propylcyclopentadienide (2.00 equiv.) added in portions. The reaction will turn light brown and become thick with suspended solid on adding the lithium propylcyclopentadienide. The reaction can then be allowed to warm slowly to room temperature and stirred 10–20 hours. The resultant brown mixture can then be filtered to give brown solid and a straw yellow solution. The solid can then be washed with ether as is known in the art, and the combined ether solutions concentrated to under vacuum to give a cold, white suspension. Off-white solid product is then isolated by filtration and dried under vacuum, with yields of from 70 to 95%.

Catalyst Composition Preparation

The catalyst compositions were made at a Al/Hf mole ratio of from about 80:1 to 130:1 and the hafnium loading on the finished catalyst was from about 0.6 to 0.8 wt % Hf using the following general procedure. Methylaluminoxane (MAO) in toluene was added to a clean, dry vessel and stirred at from 50 to 80 rpm and at from 60 to 100° F. for a time. Additional toluene can then be added while stirring. The hafnocene can then be dissolved in an amount of toluene and placed in the vessel with the MAO. The metallocene/MAO mixture can then be stirred at for from 30 min to 2 hours. Next, an amount of silica (average particle size of from 22 to 28 μm, dehydrated at 600° C.) can be added and stirred for another hour or more. The liquid can then be decanted and the catalyst composition dried at elevated temperature under flowing nitrogen while being stirred.

First Trial Polymerizations

The ethylene/1-hexene copolymers were produced in accordance with the following general procedure. The catalyst composition comprised a the silica supported bis(n-propylcyclopentadienyl)hafnium dichloride with methalumoxane, the Al:Hf ratio being from about 80:1 to 130:1. The catalyst composition was injected dry into a fluidized bed gas phase polymerization reactor. More particularly, polymerization was conducted in a 152.4 mm diameter gas-phase fluidized bed reactor operating at approximately 2068 kPa total pressure. The reactor bed weight was approximately 2 kg. Fluidizing gas was passed through the bed at a velocity of approximately 0.6 m per second. The fluidizing gas exiting the bed entered a resin disengaging zone located at the upper portion of the reactor. The fluidizing gas then entered a recycle loop and passed through a cycle gas compressor and water-cooled heat exchanger. The shell side water temperature was adjusted to maintain the reaction temperature to the specified value. Ethylene, hydrogen, 1-hexene and nitrogen were fed to the cycle gas loop just upstream of the compressor at quantities sufficient to maintain the desired gas concentrations. It should be noted that this trial was run at lower ethylene partial pressure (about 130 psi) than what would be run at larger, commercial-scale conditions, hence, resulting in overall productivities that are relatively low; the 1–15 below do exemplify the trend of maintained productivities throughout a variety of hydrogen and comonomer concentrations. Gas concentrations were measured by an on-line vapor fraction analyzer. Product (polyethylene particles) was withdrawn from the reactor in batch mode into a purging vessel before it was transferred into a product bin. Residual catalyst and activator in the resin was deactivated in the product drum with a wet nitrogen purge. The catalyst was fed to the reactor bed through a stainless steel injection tube at a rate sufficient to maintain the desired polymer production rate. There were 15 separate polymerization runs conducted using this general process, each with varying conditions as elucidated in the Tables 1–3 herein. Table 4 summarizes the polyethylene properties that resulted from each run.

"$C_6/C_2$ flow ratio ("FR")" is the ratio of the lbs of 1-hexene comonomer feed to the pounds of ethylene feed to the reactor, whereas the $C_6/C_2$ ratio is the ratio of the gas concentration of 1-hexene moles in the cycle gas to the gas concentration of ethylene moles in the cycle gas. The $C_6/C_2$ ratio is obtained from a cycle gas vapor fraction analyzer, whereas the $C_6/C_2$ Flow Ratio comes from some measure of the mass flow. The cycle gas is the gas in the reactor, and is measured from a tap off the recirculating loop around the reactor. The ratios reported in Table 1 are from the gas concentrations in the reactor. Samples are taken every 9 min, and thus reported $C_6/C_2$ ratios are running averages.

TABLE 1

Gas phase polymerizatin of ethylene and 1-hexene with bis-(n-propylcyclopentadienyl) hafnium dichloride catalyst: varying the amount of comonomer in the reactor.

| Run No. | $C_6$ conc (mol %) | $C_2$ conc. (mol %) | $C_6/C_2$ flow ratio | $C_2$ flow (g/hr) | $C_6/C_2$ ratio | Cat. prod. (g/g) |
|---|---|---|---|---|---|---|
| 1 | 0.49 | 34.4 | 0.08 | 475 | 0.014 | — |
| 2 | 0.45 | 34.4 | 0.079 | 408 | 0.013 | 907 |
| 3 | 0.44 | 33.9 | 0.071 | 390 | 0.013 | 553 |
| 4 | 0.05 | 34.6 | 0.001 | 731 | 0.001 | 1010 |
| 5 | 0 | 35 | 0 | 593 | 0 | 1082 |
| 6 | 0 | 35 | 0 | 623 | 0 | 1181 |
| 7 | 0.42 | 35 | 0.073 | 614 | 0.012 | 877 |
| 8 | 0.47 | 35 | 0.089 | 511 | 0.013 | 1070 |
| 9 | 0.76 | 34.9 | 0.085 | 480 | 0.022 | 874 |
| 10 | 0.56 | 35 | 0.131 | 536 | 0.016 | 831 |
| 11 | 0.52 | 35 | 0.14 | 545 | 0.015 | 922 |
| 12 | 0.37 | 34.9 | 0.059 | 478 | 0.011 | 595 |
| 13 | 0.31 | 35 | 0.047 | 551 | 0.009 | 690 |
| 14 | 0.24 | 35 | 0.033 | 429 | 0.007 | 498 |
| 15 | 0.17 | 35.1 | 0.022 | 551 | 0.005 | 645 |

TABLE 2

Gas phase polymerization of ethylene and 1-hexene with bis-(n-propylcyclopentadienyl) hafnium dichloride catalyst: $H_2$ conditions.

| Run No. | $C_6/H_2$ ratio | $H_2$ conc. Mol ppm | $H_2$ flow/sccm | $H_2/C_2$ ratio |
|---|---|---|---|---|
| 1 | 1.4 | 350 | 14.5 | 10.4 |
| 2 | 2.036199 | 221 | 2.5 | 6.4 |
| 3 | 1.486486 | 296 | 8.3 | 8.7 |
| 4 | 0.42735 | 117 | 4.96 | 3.4 |
| 5 | 0 | 196 | 12.8 | 5.6 |
| 6 | 0 | 39 | 0 | 1.1 |
| 7 | 7.118644 | 59 | 0 | 1.7 |
| 8 | 2.554348 | 184 | 5.18 | 5.3 |
| 9 | 7.524752 | 101 | 2.26 | 2.9 |
| 10 | 1.204301 | 465 | 14.6 | 13.3 |
| 11 | 0.44789 | 1161 | 36.99 | 33.1 |
| 12 | 2.283951 | 162 | 4.66 | 4.6 |
| 13 | 1.91358 | 162 | 5.8 | 4.6 |
| 14 | 3.692308 | 65 | 0 | 1.9 |
| 15 | 3.469388 | 49 | 0 | 0.14 |

TABLE 3

Gas phase polymerization of ethylene and 1-hexene with bis-(n-propylcyclopentadienyl) hafnium dichloride catalyst: other reactor conditions.

| Run No. | Reactor temp (° C.) | Avg. bedweight (g) | Production g/hr | Residence time (hr) | $C_2$ utilization $gC_2/gC_2$ poly | Avg. velocity (ft/s) | Catalyst feed (g/hr) |
|---|---|---|---|---|---|---|---|
| 1 | 80 | 1865 | 449 | 4.2 | 1.06 | 1.58 | 0.196 |
| 2 | 80 | 1873 | 335 | 5.6 | 1.22 | 1.56 | 0.258 |
| 3 | 80 | 1895 | 337 | 5.6 | 1.16 | 1.55 | 0.425 |
| 4 | 85 | 1907 | 547 | 3.5 | 1.34 | 1.52 | 0.337 |
| 5 | 85 | 1912 | 505 | 3.8 | 1.17 | 1.58 | 0.325 |
| 6 | 80 | 1910 | 449 | 4.3 | 1.39 | 1.56 | 0.265 |
| 7 | 74 | 1887 | 487 | 3.9 | 1.26 | 1.6 | 0.387 |
| 8 | 74 | 1851 | 431 | 4.3 | 1.19 | 1.6 | 0.281 |
| 9 | 80 | 1867 | 374 | 5 | 1.28 | 1.58 | 0.298 |
| 10 | 80 | 1875 | 460 | 4.1 | 1.17 | 1.59 | 0.386 |
| 11 | 80 | 1901 | 475 | 4 | 1.15 | 1.57 | 0.359 |
| 12 | 80 | 1916 | 404 | 4.7 | 1.18 | 1.58 | 0.473 |
| 13 | 80 | 1921 | 469 | 4.1 | 1.17 | 1.57 | 0.473 |
| 14 | 80 | 1933 | 338 | 5.7 | 1.27 | 1.55 | 0.473 |
| 15 | 80 | 1899 | 431 | 4.4 | 1.28 | 1.58 | 0.645 |

TABLE 4

Gas phase polymerization of ethylene and 1-hexene with bis-(n-propylcyclopentadienyl) hafnium dichloride catalyst: polyethylene copolymer properties.

| Run No. | $I_2$ | $I_{21}$ | $I_{21}/I_2$ | Gradient density (g/cm³) | Bulk density (g/cm³) |
|---|---|---|---|---|---|
| 1 | 20.67 | — | — | 0.9247 | — |
| 2 | 1.52 | — | — | 0.9213 | — |
| 3 | 10.17 | 204.13 | 20.07 | 0.9248 | 0.4618 |
| 4 | 1.03 | 17.39 | 16.88 | 0.9515 | 0.4745 |
| 5 | 8 | 153.61 | 19.2 | 0.9611 | 0.4893 |
| 6 | 0.01 | — | — | 0.9434 | 0.4705 |
| 7 | 0.01 | — | — | 0.9121 | 0.4578 |
| 8 | 1.08 | 24.16 | 22.37 | 0.9152 | 0.454 |
| 9 | 1.39 | 23.18 | 16.68 | 0.9173 | 0.4445 |
| 10 | 8.86 | 177.91 | 20.08 | 0.912 | 0.4358 |
| 11 | 174.92 | — | — | 0.9131 | 0.4198 |
| 12 | 1.2 | 22.91 | 19.09 | 0.9224 | 0.4405 |
| 13 | 1.73 | 30.35 | 17.54 | 0.9273 | 0.4395 |
| 14 | 0.33 | — | — | 0.9246 | — |
| 15 | 0.11 | 2.04 | 18.55 | 0.9267 | 0.4432 |

Second Trial Polymerization

This second set of runs 16–20 were preformed in a continuous gas phase fluidized bed reactor similar to the one described above, except the diameter is 14 inches (355.6 mm), with some varying reactor conditions, as elucidated in Tables 5 and 6. Also, the hafnocene in this trial was bis(n-propylcyclopentadienyl)hafnium difluoride. In run 19, isopentane was added as a condensing agent. Further in run 19, a "continuity additive" was added continuously to the reactor, that additive including an ethoxylated amine type of compound and an aluminum distearate compound. The same catalyst composition is used.

"$C_6/C_2$ FR" is the ratio of the lbs of 1-hexene comonomer feed to the pounds of ethylene feed to the reactor, whereas the $C_6/C_2$ ratio is the ratio of the gas concentration of 1-hexene moles in the cycle gas to the gas concentration of ethylene moles in the cycle gas. The $C_6/C_2$ ratio is obtained from a cycle gas vapor fraction analyzer, whereas the $C_6/C_2$ Flow Ratio comes from some measure of the mass flow. The cycle gas is the gas in the reactor, and is measured from a tap off the recirculating loop around the reactor.

TABLE 5

Second trail in another continuous gas phase reactor at different reaction conditions

| Parameter | 16 | 17 | 18 |
|---|---|---|---|
| Temp, ° C. | 77 | 77 | 77 |
| $C_2$ partial pressure, psia | 240 | 240 | 240 |
| Reactor pressure, psig | 348 | 352 | 349 |
| SGV, fps | 2.1 | 2.0 | 2.0 |
| Fluidized BD (g/cm³) | 0.234 | 0.2146 | 0.279 |
| $C_2$ mol % | 66.2 | 65.4 | 66.1 |
| Isopentane, mol % | 0 | 0 | 0 |
| $C_6$ mol % | 0.42 | 0.09 | 0.90 |
| $H_2$ mol % | 0.0298 | 0.0179 | 0.0266 |
| $C_6/C_2$ | 0.0064 | 0.0014 | 0.0135 |
| $C_6/C_2$ FR (lb/lb) | 0.0121 | 0.0001 | 0.077 |
| $H_2$ ppm | 298 | 180 | 265 |
| $H_2$ ppm/$C_2$ mol % | 4.52 | 2.76 | 4.0 |
| Dew Point, ° C. | 1.5 | −21 | 15.6 |
| Rx Vent, pph | 38 | 46 | 41 |
| Res. Time, hr | 1.8 | 2.0 | 2.1 |
| STY | 8.3 | 6.8 | 8.2 |
| Lab Hf, ppm | 1.30 | 1.20 | 1.0 |
| Lab Al, ppm | 23.5 | 20.8 | 21.4 |
| Productivity, Cat Feeder, g/g | 5,807 | 6,023 | 7,631 |
| Productivity lab Hf, g/g | 5,486 | 5,645 | 6,698 |
| Productivity lab Al, g/g | 5,120 | 5,793 | 5,681 |
| Avg. Prod. g/g | 5,471 | 5,820 | 6,670 |
| $I_2$, dg/min | 3.88 | 1.51 | 0.69 |
| $I_{21}/I_2$ | 16.4 | 15.8 | 31.0 |
| Density, g/cm³ | 0.9369 | 0.9435 | 0.9180 |
| APS, mm | 0.604 | 0.617 | 0.597 |
| Fines, % | 0.2 | 0.4 | 0.8 |
| 10 Mesh, % | 0.1 | 0.1 | 0.1 |
| 18 Mesh, % | 2.2 | 2.8 | 2.4 |
| 35 Mesh, % | 65.8 | 67.0 | 63.2 |
| 60 Mesh, % | 28.3 | 26.8 | 29.8 |
| 120 Mesh, % | 3.4 | 3.0 | 3.6 |
| 200 Mesh, % | 0.2 | 0.2 | 0.4 |
| Pan, % | 0.0 | 0.2 | 0.4 |
| Bulk Density, g/cm³ | 0.393 | 0.343 | 0.469 |

TABLE 6

Second trail in another continuous gas phase reactor at different reaction conditions

| Parameter | 19 | 20 |
|---|---|---|
| Temp, ° C. | 77 | 85 |
| $C_2$ partial pressure, psia | 240 | 240 |
| Reactor pressure, psig | 349 | 351 |
| SGV, fps | 2.0 | 2.1 |
| Fluidized BD (g/cm³) | 0.285 | 0.197 |
| $C_2$ mol % | 66.0 | 65.6 |
| Isopentane, mol % | 2.0 | 0 |
| $C_6$ mol % | 0.92 | 0.148 |
| $H_2$ mol % | 0.0266 | 0.0700 |
| $C_6/C_2$ | 0.0139 | 0.0022 |
| $C_6/C_2$ FR (lb/lb) | 0.064 | 0.0012 |
| $H_2$ ppm | 265 | 700 |
| $H_2$ ppm/$C_2$ mol % | 4.0 | 10.7 |
| Dew Point, ° C. | 26 | −14.6 |
| Rx Vent, pph | 54 | 51 |
| Res. Time, hr | 2.3 | 2.0 |
| STY | 7.9 | 6.0 |
| Continuity additive in bed, ppm | 35 | 0 |
| Lab Hf, ppm | 1.6 | 1.4 |
| Lab Al, ppm | 27 | 25 |
| Productivity, Cat Feeder, g/g | 5,190 | 4,866 |
| Productivity lab Hf, g/g | 4,198 | 4,869 |
| Productivity lab Al, g/g | 4,652 | 4,788 |
| Avg. Prod. g/g | 4,680 | 4,841 |
| $I_2$, dg/min | 0.51 | 66.5 |
| $I_{21}/I_2$ | 33.4 | 18.8 |
| Density, g/cm³ | 0.9176 | 0.9534 |
| APS, mm | 0.559 | 0.533 |
| Fines, % | 0.4 | 0.9 |
| 10 Mesh, % | 0.1 | 0.2 |
| 18 Mesh, % | 1.7 | 0.3 |
| 35 Mesh, % | 52.5 | 54.1 |
| 60 Mesh, % | 40.6 | 40.0 |
| 120 Mesh, % | 4.7 | 4.6 |
| 200 Mesh, % | 0.3 | 0.5 |
| Pan, % | 0.1 | 0.4 |
| Bulk Density, g/cm³ | 0.461 | 0.410 |

Figure 1:
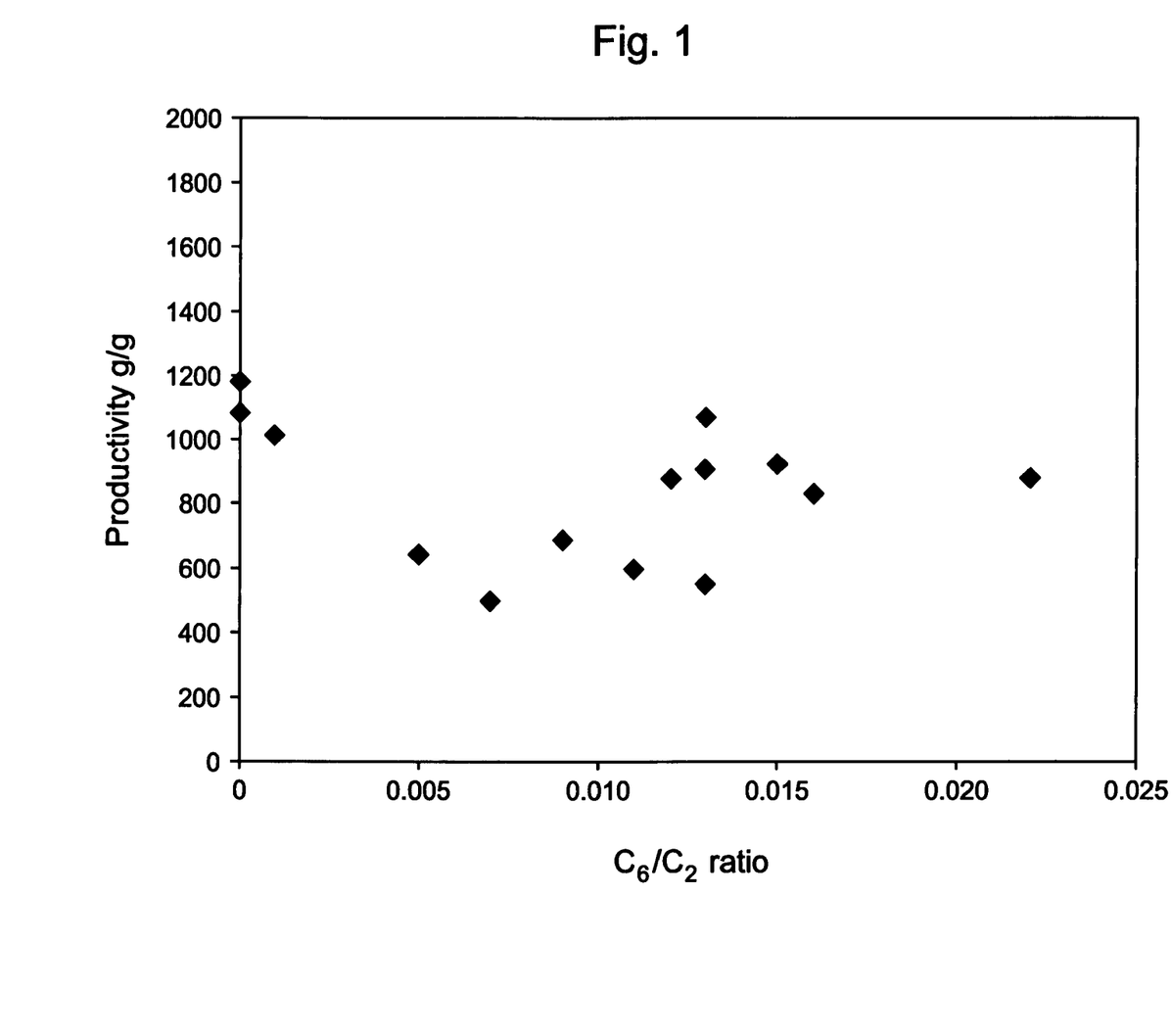
FIG. 1 is a graphical representation of data from Tables 2–4, plotting the relationship between the catalyst productivity Inventive examples as a function of 1-hexene to ethylene molar ratio in the reactor.
Figure 2:
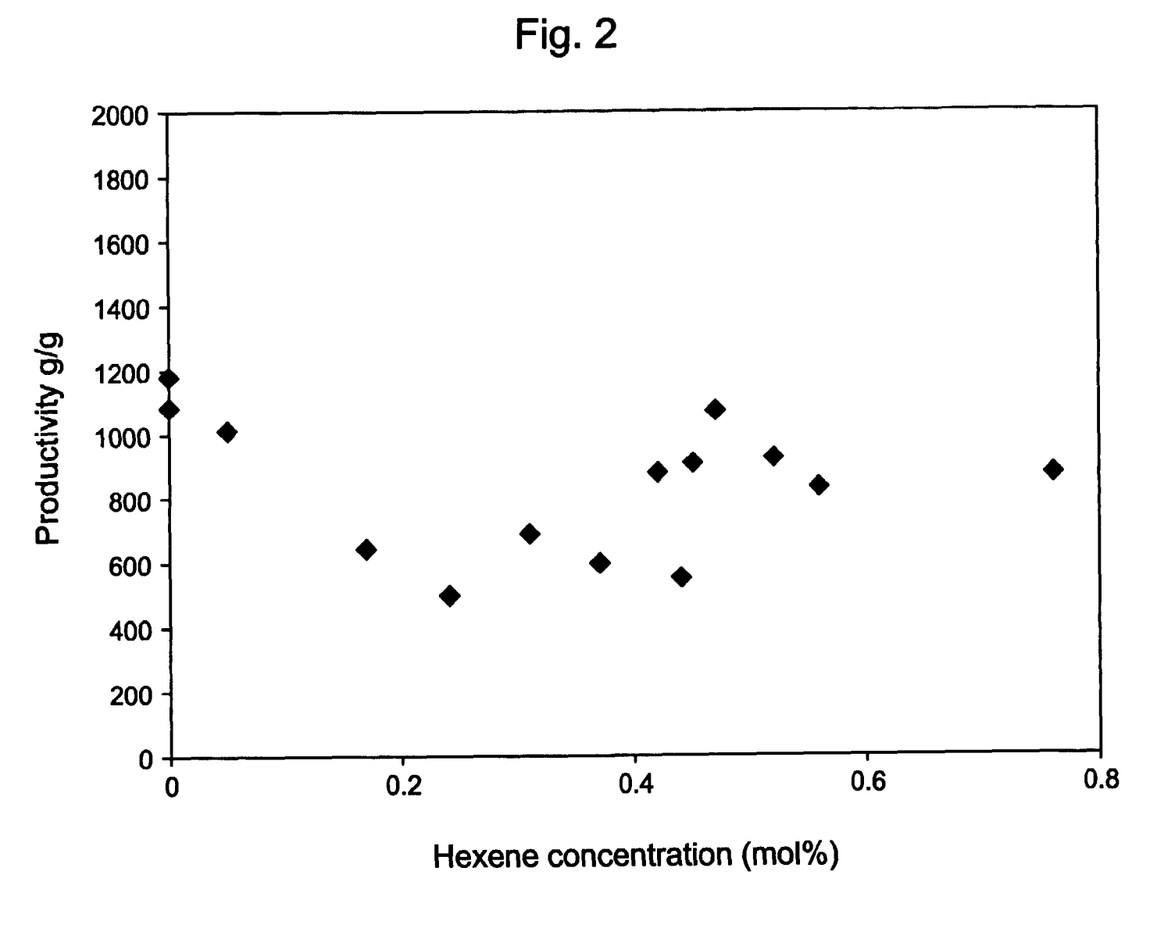
FIG. 2 is a graphical representation of data from Tables 2–4, plotting the relationship of the catalyst productivity in the inventive examples as a function of 1-hexene concentration in the reactor.
Figure 3:
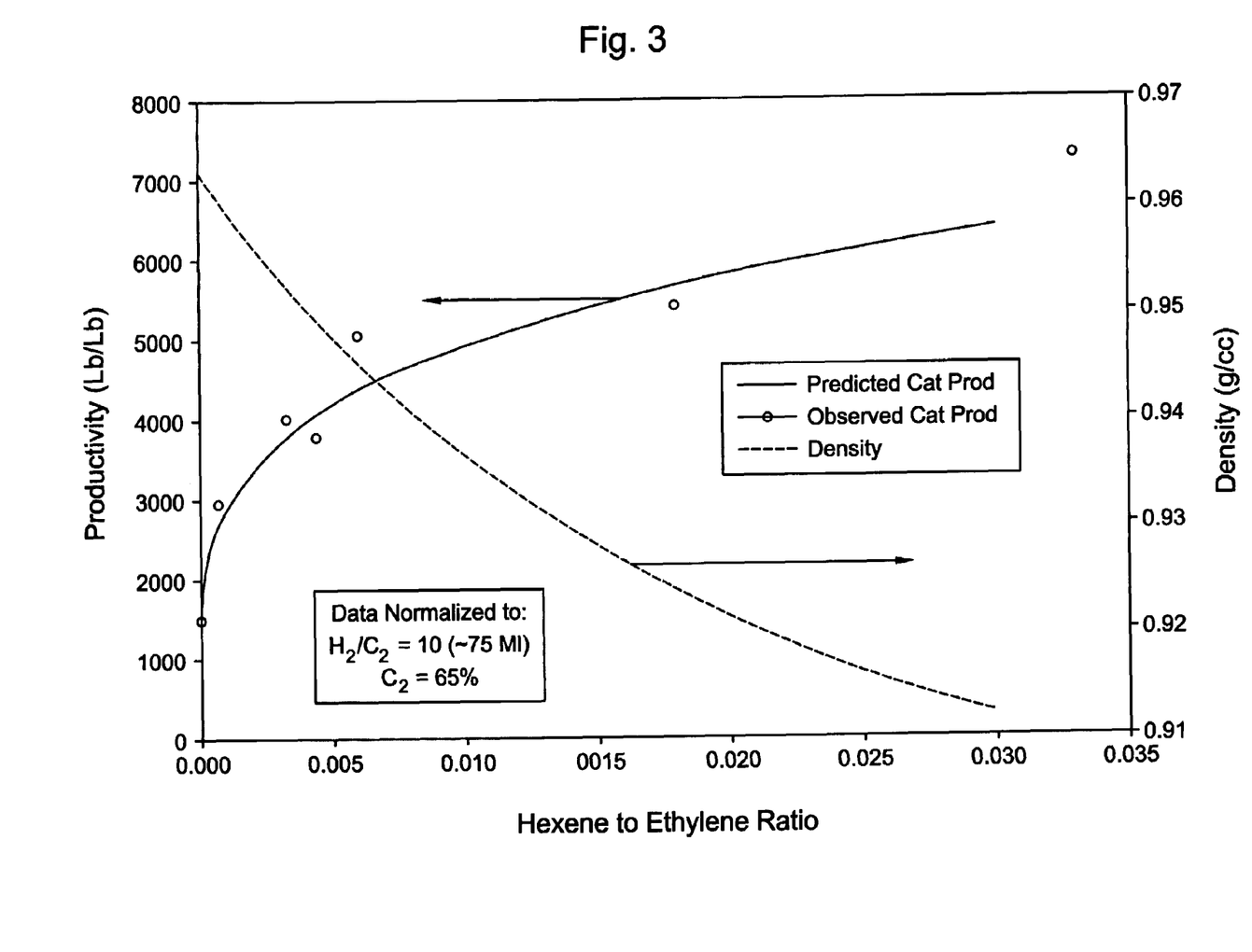
FIG. 3 is a graphical representation of Comparative examples (bis-alkyl-cyclopentadienyl)zirconium dihalide) catalyst composition productivity and polyethylene copolymer density as a function of 1-hexene to ethylene molar ratio in the gas phase polymerization reactor operated under conditions similar to that described in the Examples.
Figure 4:
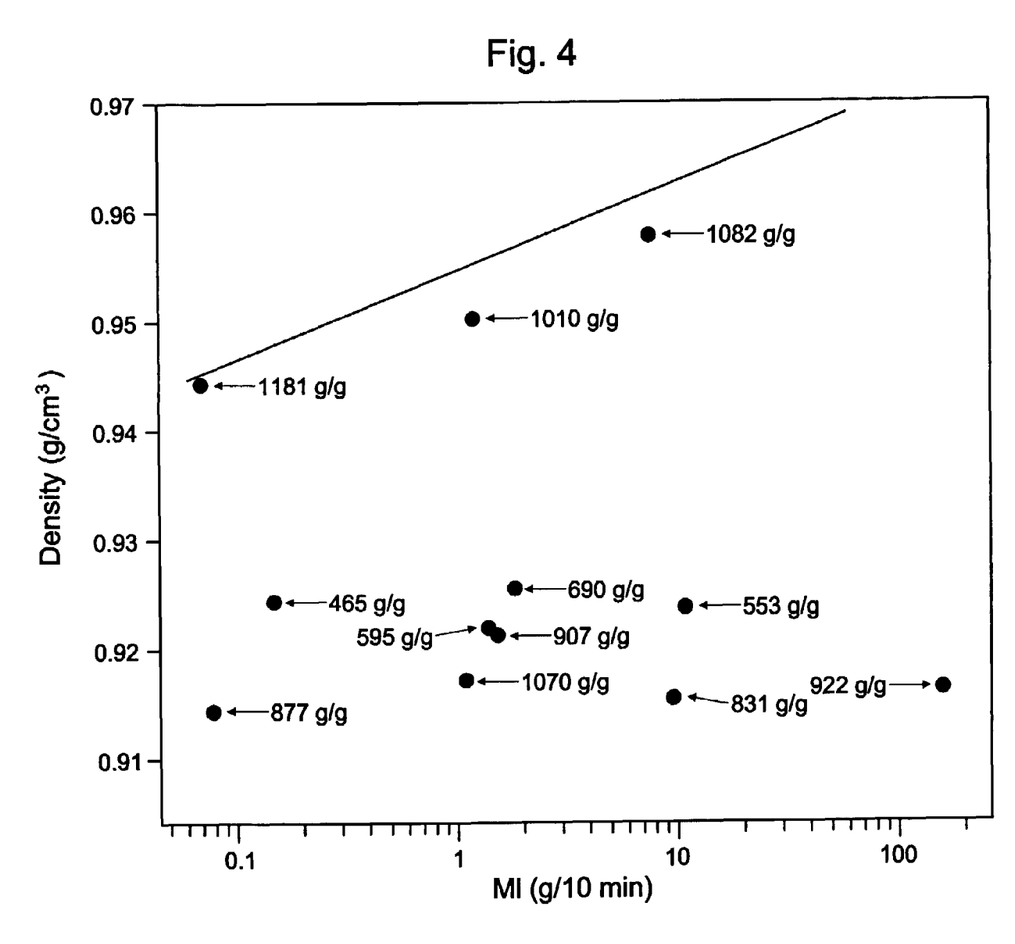
FIG. 4 is a graphical representation of data from Tables 2–4, plotting the relationship between polyethylene density as a function of melt index (MI, $I_2$) where the numbers for each data point represent the catalyst composition productivity and the dashed line is an estimate of the homopolymer density over the MI range of 0.05–200 g/10 min.

As shown in the comparative date in FIG. 3, wherein MAO/silica supported bis(alkyl-cyclopentadienyl) zirconocene dihalide is the catalyst component, it can be seen that as the density of the polymer being produced increases (hence, the amount of comonomer decreases), the productivity of that catalyst composition goes down dramatically. Thus, it is difficult to produce polyethylenes between 0.930 to 0.975 g/cm$^3$ in a commercially acceptable manner using common metallocenes. The present invention solves this, wherein the catalyst composition productivity stays relatively constant in going from high comonomer (e.g., 0.10 ratio of $C_6$:$C_2$) thus producing a low density polyethylene of, for example, 0.915 g/cm$^3$, to low comonomer (e.g., 0.001 ratio of $C_6$:$C_2$) or no comonomer thus producing a high density polyethylene of, for example, 0.960 g/cm$^3$. This is done while also, in one embodiment, maintaining an advantageously high bulk density and, in another embodiment, and advantageously narrow particle size distribution having few "fines" (particles filling in the pan or on the 200 mesh), which can cause reactor fouling.

It can also be seen in the data that transitions during the same "trial" can occur using the same catalyst component. By "trial" what is meant is what one skilled in the art would understand to be a production run of a given resin composition in a given reactor over a period of hours or days. That is, the reactor can be transitioned without changing the catalyst component from making a low density polyethylene to making a medium or high density polyethylene while maintaining a commercially acceptable productivity, as well as acceptable and advantageous bulk densities and other features (such as low hexane extractables and low residual extractables) in the polyethylene. This is advantageous in that the resin product can be altered quickly and efficiently.

We claim:

1. A method for transitioning within a single reactor from a first polyethylene product to a second polyethylene product, comprising:

(a) operating the reactor at a pressure of less than 10,000 kPa with a first molar ratio of hydrogen to ethylene and a first molar ratio of comonomer to ethylene;

(b) withdrawing a first polyethylene product;

(c) altering one or both of the molar ratio of hydrogen to ethylene and the molar ratio of comonomer to ethylene to achieve a second molar ratio of hydrogen to ethylene and a second molar ratio of comonomer to ethylene; and (d) withdrawing a second polyethylene product;

wherein the transition takes place using the same catalyst composition and wherein the density of the first polyethylene product is less than or equal to 0.920 g/cm$^3$, and the density of the second polyethylene product is greater than or equal to 0.935 g/cm$^3$, or wherein the transition takes place using the same catalyst composition and wherein the $I_2$ of the first polyethylene product is less than or equal to 8, and the $I_2$ of the second polyethylene product is greater than or equal to 12.

2. The method of claim 1, further characterized in that when the molar ratio of α-olefin to ethylene present in the reactor ranges from 0 to 0.20, the catalyst productivity does not vary by more than 30%.

3. The method of claim 1, further characterized in that when the molar ratio of hydrogen to ethylene present in the reactor ranges from 0 to 60, the catalyst productivity does not vary by more than 30%.

4. The method of claim 1, wherein the catalyst composition comprises a hafnocene.

5. The method of claim 1, wherein the polymerization reactor is a continuous gas phase fluidized bed reactor.

* * * * *